United States Patent [19]

Mace et al.

[11] Patent Number: 5,750,268

[45] Date of Patent: May 12, 1998

[54] MULTILAYER POLYMER SYSTEM COMPRISING AT LEAST ONE ENGINEERING THERMOPLAST LAYER AND AT LEAST ONE SOFT TOUCH COMPOSITION LAYER, AND COMPOSITIONS TO BE USED THEREFORE

[75] Inventors: Jean-Michel Mace; Jacques Moerenhout, both of Louvain-la-Neuve, Belgium

[73] Assignee: Shell Oil Company, Houston, Tex.

[21] Appl. No.: 731,127

[22] Filed: Oct. 9, 1996

[30] Foreign Application Priority Data

Oct. 26, 1995 [EP] European Pat. Off. ............ 95307632

[51] Int. Cl.$^6$ .............................. C08L 77/00; B32B 9/04; B32B 27/08
[52] U.S. Cl. ......................... 428/475.8; 428/474.9; 428/474.7; 428/475.5; 428/476.3; 525/92
[58] Field of Search .................. 428/475.8, 476.3, 428/475.5, 474.9, 474.7; 525/92

[56] References Cited

U.S. PATENT DOCUMENTS

| H731 | 2/1990 | Gergen et al. | |
|---|---|---|---|
| 4,174,358 | 11/1979 | Epstein | 525/183 |
| 4,332,858 | 6/1982 | Saitoh et al. | 428/412 |
| 4,427,828 | 1/1984 | Hergenrother et al. | 525/66 |
| 4,429,076 | 1/1984 | Saito et al. | 525/57 |
| 4,601,941 | 7/1986 | Lutz et al. | 428/213 |
| 4,628,072 | 12/1986 | Shiraki et al. | 525/57 |
| 4,657,970 | 4/1987 | Shiraki et al. | 525/57 |
| 4,844,471 | 7/1989 | Terence et al. | 273/220 |
| 5,002,625 | 3/1991 | Naritomi et al. | 156/245 |
| 5,149,589 | 9/1992 | Naritomi et al. | 428/412 |
| 5,272,208 | 12/1993 | Shiraki et al. | 525/92 |
| 5,371,141 | 12/1994 | Gelles et al. | 525/66 |

FOREIGN PATENT DOCUMENTS

| 0085115 | 8/1982 | European Pat. Off. | |
|---|---|---|---|
| 0215501 | 8/1986 | European Pat. Off. | C08F 8/04 |
| 0398758 | 5/1990 | European Pat. Off. | |
| 0409580 | 7/1990 | European Pat. Off. | |

OTHER PUBLICATIONS

Database "Chemical Abstracts" (Host: STN); Abs. 114: 208 838, Colombus, OH, USA, & JP-A-02 217 683 (Toyobo Co., Ltd) 30 Aug. 1990 XP002022965 *the whole document*, Jan. 17, 1997.

Database "Chemical Abstracts" (Host: STN); Abs. 125: 117 011, Colombus, OH, USA, & JP-A-08 156 182 (Toray Ind., Japan) 18 Jun. 1996 XP002022966*the whole document* Jan. 17, 1997.

Database "Chemical Abstracts" (Host:STN); Abs. 125: 144 616, Colombus, OH, USA, & JP-A-08 132 459 (Toray Ind., Japan) 28 May 1996 XP002022967*the whole document*, Jan. 17, 1997.

European Search Report of 17 Jan. 1997.

*Primary Examiner*—Ana Woodward
*Attorney, Agent, or Firm*—Donald F. Haas

[57] ABSTRACT

A multilayer polymer composition comprising at least one relatively soft touch layer comprising at least one block copolymer derived from a monovinyl aromatic and a conjugated diene, and at least one layer of relatively hard, rigid thermoplastic which have intimate contact with each other, characterized in that it comprises:

(a) at least one relatively soft layer composition comprising
(i) a polar engineering thermoplast in an amount of from 5 to 50 wt %
(ii) from 0 to 80 wt % of a selectively hydrogenated block copolymer having at least two poly(monovinyl aromatic) blocks and at least one poly(conjugated diene) block, wherein the residual ethylenic unsaturation after hydrogenation is at most 5%,
(iii) from 5 to 85 wt % of a selectively hydrogenated block copolymer having at least two poly(monovinyl aromatic) blocks and at least one poly(conjugated diene) block wherein the residual ethylenic unsaturation after hydrogenation is at most 5%, said block copolymer being functionalized by means of introduced polar groups, and (iv) a plasticizer, in an amount of from 0 to 40 wt %, wherein all ingredients amounts relative to the weight of the total soft layer composition and the sum of the respective amounts in the ingredients (i) to (iv) is 100 wt %, and (b) at least one relatively hard, rigid layer, comprising at least a polar engineering thermoplast;

and starting soft touch compositions therefor.

6 Claims, No Drawings

5,750,268

MULTILAYER POLYMER SYSTEM COMPRISING AT LEAST ONE ENGINEERING THERMOPLAST LAYER AND AT LEAST ONE SOFT TOUCH COMPOSITION LAYER, AND COMPOSITIONS TO BE USED THEREFORE

FIELD OF THE INVENTION

The present invention relates to a multilayer polymer system comprising at least one engineering thermoplast layer and at least one soft touch composition layer, to compositions to be used therefor, and to shaped articles derived from said system. In particular, the invention relates to a multilayer polymer system comprising at least one soft touch layer derived from at least an optionally selectively hydrogenated block copolymer composed of at least one monovinyl aromatic monomer and one conjugated diene, and a polar engineering thermoplast, and a plasticizer, in combination with at least one polar engineering thermoplast layer, and to shaped articles derived from said system.

BACKGROUND OF THE INVENTION

Components for tools, appliances, and automotive applications are increasingly designed to combine a structural rigid plastic layer with an overmolded soft block copolymer containing composition for good grip and/or soft touch. In particular, an increasing need has developed for strongly fusion bound combinations of a relatively hard, rigid thermoplastic engineering polymer component, such as polyamides and polyesters derived from aromatic acids, in particular Nylon 6, Nylon 6,6, poly(ethylene terephtalate), poly(propylene terephtalate), poly(butylene terephatalate, and a relatively soft touch component comprising a styrenic block copolymer, the soft layer of which may act as sealing element or as element enabling good grip. The need is especially acute in electric tools and electric appliances having soft handles.

U.S. Pat. No. 4,332,858 discloses multilayer laminates, comprising at least one A-B double layer structure. Layer A is comprised of at least one material selected from the group consisting of olefin polymers, polyamide polymers, polyacrylate polymers polyether polymers, polycarbonate polymers, polyurethane polymers, vinylidene chloride polymers, thermosetting resins, vulcanised rubbers, glass, and paper. Layer B is comprised of mainly a modified block copolymer in which an unsaturated carboxylic acid or its derivative had been grafted on a styrene-butadiene block copolymer of straight chain structure, branched chain structure, radial structure, or combination thereof. However, no reference was made to the use of block copolymers comprising selectively hydrogenated poly(butadiene) blocks.

U.S. Pat. No. 5,002,625 discloses a process for producing a composite molded product by fusion-bonding a thermoplastic elastomer composition to a molded piece which had previously been formed from a synthetic resin material and which had a higher hardness (JIS Shore hardness A scale) than that of a molded piece formed from said thermoplastic elastomer composition, or by fusion bonding a synthetic resin material to a molded piece which had previously been formed from a thermoplastic elastomer composition and which had a lower hardness than that of a molded piece formed from said synthetic resin material, wherein said thermoplastic elastomer composition comprised: 100 parts by weight of a thermoplastic elastomer and 25 to 185 parts by weight of a polyether block amide. The thermoplastic elastomer could be selected from hydrogenated SBS block copolymer, olefin elastomer, diene elastomer urethane elastomer, and plasticized polyvinylchloride. Engineering plastics actually used were polycarbonates, Acrylonitrile-Butadiene-Styrene resin, methacrylate resin, Nylon 11, and Nylon 12. The complete multilayered article was always produced by two separate molding process steps, i.e. injection molding of, e.g., the polycarbonate piece, followed by fusion bonding the thermoplastic elastomer to the polycarbonate body portion through an injection molding process step.

U.S. Pat. No. 5,149,589 discloses a thermoplastic elastomer composition which was fusion bonded to a molded piece which was in turn formed from a rigid synthetic resin material to form a composite molded product, wherein said thermoplastic elastomer composition comprised:

(1) 100 parts by weight of a thermoplastic elastomer selected from the group consisting of a hydrogenated SBS block copolymer, olefin elastomer, diene elastomer, and poly(urethane) elastomer, and (2) 25 to 185 parts by weight of a thermoplastic polyester elastomer, said thermoplastic polyester elastomer being a polyether-ester copolymer which has a polyester segment prepared from an aromatic dicarboxylic acid and a short-chain glycol, and a polyether segment which had been prepared from an aromatic dicarboxylic acid and a polyalkylene glycol. The synthetic resin material to be used was mentioned to be selected from polycarbonate, Nylon 11, Nylon 12, ABS resin and methacrylate resin.

The complete multilayered-layered article was always produced by two separate molding process steps, i.e. injection molding of, e.g., the polycarbonate piece followed by fusion bonding the thermoplastic elastomer composition to the polycarbonate body portion through an injection molding process step. It will be appreciated that a disadvantage of the fusion bound multilayer polymer systems which, according to both said U.S. patents, was the operation in two separate molding steps while a specific tailor made, relatively expensive polyether and/or polyester block copolymer had to be used in the elastomeric composition.

U.S. Pat. No. 5,371,141 discloses a polymer composition showing a ⅛" Notched Izod impact strength of 22.9 ft-lb/inch at room temperature and comprising:

(1) 80% by weight of a linear Nylon 6, 6 polyamide, having a number average molecular weight of at least 5000 and a melting point in excess of 200° C.; and (2) 20% by weight of a 1:1 blend of an unmodified poly(styrene)-hydrogenated poly(butadiene)-poly(styrene) block copolymer, containing 29 wt % of the styrene, and a modified poly(styrene)-hydrogenated poly(butadiene)-poly(styrene) block copolymer containing 29 wt % of the styrene, and having maleic anhydride groups grafted to the hydrogenated butadiene blocks in an amount of 1.6 wt % of the modified block copolymer. No reference was made to fusion bonding between relatively hard, rigid and relatively soft touch polymer layers.

It is an object of the present invention to provide such multilayer systems which meet the present bonding requirements and which can be manufactured in a one step operation, i.e. a comolding step, in order to save production costs as compared to the use of two separate molding steps. As a result of extensive research and experimentation, such multilayer polymer systems, which appear to meet the modern requirements, have been surprisingly found.

SUMMARY OF THE INVENTION

Accordingly, the present invention relates to a multilayer polymer composition comprising at least one relatively soft touch layer comprising at least one block copolymer derived from a monovinyl aromatic and a conjugated diene, and at least one layer of relatively hard, rigid thermoplastic. The layers have intimate contact with each other. The multilayer composition is characterized in that it comprises:

(a) at least one relatively soft layer composition comprising
 (i) a polar engineering thermoplast in an amount of from 5 to 50 percent by weight (wt %),
 (ii) 0 to 80 wt % of a selectively hydrogenated block copolymer having at least two poly(predominantly monovinyl aromatic) blocks and at least one poly(predominantly conjugated diene) block, wherein the residual ethylenic unsaturation after hydrogenation is at most 5%, and preferably at most 2%,
 (iii) from 5 to 85 wt % of a selectively hydrogenated block copolymer having at least two poly(predominantly monovinyl aromatic) blocks and at least one poly(predominantly conjugated diene) block wherein the residual ethylenic unsaturation after hydrogenation is at most 5%, and preferably at most 2%, said block copolymer being functionalized by means of introduced polar groups such as carboxyl, carboxylic acid, acid anhydride, amide, amine epoxy and the like, and
 (iv) a plasticizer in an amount of from 0 to 40 wt %, wherein all ingredients amounts relative to the weight of the total soft layer composition and the sum of the respective amounts of ingredient (i)–(iv) being 100 wt %; and (b) at least one relatively hard, rigid layer, comprising at least a polar engineering thermoplast.

Suitable polar engineering thermoplasts which can be applied as component (a.i) and component (b) may be selected from polyamides such as NYLON 6,6 or NYLON 6, polyesters derived from an aromatic acid such as polyethyleneterephthalate (PET), polypropylene terephthalate (PPT), and polybutylene terephthalate (PBT), optionally mixed with polyurethane resins such as VANDAR (trademark), polycarbonates, and modified polycarbonates. Polyamides such as Nylon 6, Nylon 6,6, and the polyesters derived from aromatic acids such as PET, PPT, and PBT are preferred. Most preferred are PET and PBT.

The preferred amount of component (a, i) is in the range of from 10 to 35 wt %. The preferred amount of component (a, ii) is in the range of from 10 to 70 wt %, and the preferred range of component (a, iii) is in the range of from 15 to 75 wt %. The preferred amount of component (a, iv) is in the range of from 5 to 30 wt %.

DETAILED DESCRIPTION OF THE INVENTION

It will be appreciated that the hydrogenated block copolymer components (a, ii) and (a, iii) may be different or the same and they may be linear or branched, with the term "branched" also including symmetric or asymmetric radial and star structures. Functionalized hydrogenated block copolymers to be used as component (a, iii) may be prepared by methods known from e.g. European patents 0085115, 0103148, 0215501, 0216347, 0262691, European patent applications no. 0349085, no. 0450694, no. 0458379 and U.S. Pat. Nos. 4,174,358, 4,429,076, 4,427,828, 4,628,072, 465,791, 4,844,471 which are herein incorporated by reference. Preferably, functionalized hydrogenated block tricopolymers component(s) (a, iii), are used in the formula A-B-C, wherein blocks A and C are the same or different and have been derived from predominantly styrene and wherein the B block have been derived from predominantly butadiene or isoprene. Block B is substantially hydrogenated and grafted preferably with an unsaturated acid in the presence of an organic peroxide. The unsaturated acid is grafted in an amount of up to 5 wt % and preferably in an amount of from 0.5 wt % to 2 wt %. More preferably, the hydrogenated block copolymers have been grafted with a diacid and most preferably with maleic acid.

According to more preferred embodiments ABC block copolymers are used as components (a, ii) and (a, iii) wherein A and C are about the same, have been derived from substantially pure styrene, and have weight average molecular weights in the range of from 3000 to 60,000. Block B, prior to hydrogenation, has been derived from substantially pure 1,3 butadiene and has a weight average molecular weight in the range of from 10,000 to 150,000. Blocks A and C constitute from 10 to 40 wt % of the total block copolymer weight.

Examples of suitable commercial block copolymer grades which can be used for the components (a, i.i) are KRATON® G 1650, KRATON® G 1651, KRATON® G 1652, KRATON® G 1653, KRATON® G 1654, KRATON® G 1657, and KRATON® G 1726 block copolymers. Examples of suitable commercial block copolymer grades which can be used as component (a, iii) are KRATON® FG 1901 or KRATON® FG 1924 block copolymers.

The term "predominantly" means that the respective blocks A, B, and C may be mainly derived from a monovinyl aromatic or a conjugated diene which monomers may be mixed with other structurally related or non related co-monomers, e.g., styrene as main component and small amounts (up to 10 wt %) of other monomers (α, methylstyrene or butadiene) or butadiene mixed with isoprene and/or with styrene.

It will be appreciated that as ingredient (a, iv) a great variety of plasticizers can be successfully applied. Various plasticizing oils are useful as extender in the compositions to be used according to the present invention. Plasticizing oils which have been found useful include petroleum derived oils, olefin oligomers, and low molecular weight polymers, as well as vegetable and animal oil which may be employed are relatively high boiling materials, containing only a minor proportion of aromatic hydrocarbons preferably less than 20% and more preferably less than 10% by weight of the oil. Most preferably the oil may be totally non-aromatic.

The oligomers may be poly(a-olefin) such as poly(propylene), poly(butylene), poly(dodecene), hydrogenated poly(isoprene), hydrogenated poly(butadiene), hydrogenated poly(piperylene), and hydrogenated copolymers of piperylene and isoprene, having average molecular weights between 350 and 10,000. Vegetable and animal oils include glyceryl esters of the usual fatty acids and polymerisation products thereof.

Examples of a preferred paraffinic oil are PRIMOL 352 (PRIMOL is a trademark) and the NAPVIS and HYVIS (trademarks) polyolefins, having a molecular weight in the range of from 500 to 6,000, and ETHYLFLO grades (ETHYLFLO is a trademark). Preferably, paraffinic oil or low molecular weight poly(alpha-olefin) is used as plasticizer in at least one of the layers of the multilayer polymer blend system.

It will be appreciated that a significant advantage is formed by the fact that the multilayer polymer blend systems according to the present invention can be produced in one single comolding step. This provides a significant cost savings while the adhesion strength between the layers meets the highest modern requirements.

The multilayer polymers blend systems according to the present invention can be produced by co-extrusion, double injection molding, co-compression molding, and other usual molding processes.

It will be appreciated that the compositions a and b, from which the comolded multilayer polymer blend systems are derived, may in addition contain one or more auxiliaries, and more in particular, fillers and/or stabilizers. Suitable examples of such fillers are glass fibers, talc, and calcium carbonate which may provide additional stiffness to one of the colayers.

It will be appreciated that the comolded multilayer polymer blend systems according to the present invention can be prepared by blending the individual constituents for each layer or starting from preblends containing two or more of the respective constituents.

Another aspect of the present invention is formed by the soft touch block copolymer compositions to be used as component (a) of the multilayer polymer system. Still another aspect of the present invention is formed by the shaped articles derived from the multilayer polymer systems as hereinbefore specified such as electric tools, appliances, and automotive parts.

Preferred multilayer polymer systems have been found to be composed of a rigid, hard layer (component b) derived from a polyamide such as Nylon 6,6, or Nylon 6 and a soft touch composition (component a) comprising PET, PBT, or polyamide (as component a,i). Most preferred is a combination of a soft composition comprising (ai) a polyamide such as Nylon 6 or Nylon 6,6 and a hard, rigid layer of a polyamide which shows an excellent fuse on bond strength.

On the other hand it was found that no sufficiently strong fusion bond was formed between a hard, rigid PBT or PET layer or VANDAR layer and a soft composition (a) comprising as component (a,i) a polyamide such as Nylon 6 or Nylon 6,6. It was also found that incorporation of a similar amount of VANDAR in a soft block copolymer composition did not adhere to a VANDAR hard layer.

The most preferred combination has been found to be a rigid, hard layer of a polyamide in combination with composition (a) comprising polyamide as ingredient (a,i).

The invention will be further illustrated by the following examples, however without restricting its scope to these embodiments.

EXAMPLES

Preparation of Compositions

Compositions according to present invention (I) and three comparative compositions A, B, and C, as listed in the Table 1, were prepared by first pre-soaking the KRATON® G block copolymer with oil in a 5 liter Papenmeier mixer for 20 minutes, whereafter all other listed ingredients were added and the resulting mixture was stirred for another 5 minutes. The obtained preblends were subsequently dried for one night in a vacuum oven at 80° C. Said preblends were compounded. The preblends were compounded using a Werner and Pfleiderer ZSK twin screw corotating extruder. Actual temperature settings of the extruder have been listed in Table 2.

The extrudate strands were cooled in a water bath and subsequently granulated. The granulated compounds were dried in a vacuum oven at 80° C. for one night before being injection molded into 150×150×2 mm test plates and overmolded as a 2 mm thick layer onto premolded 100×150×2 mm insert plates of PA6, PA66, PP and VANDAR (a PBT/TPU alloy used in interior automotive parts) using a DEMAG D150 injection molding machine. Injection molding settings are given in Table 2.

Assessment of the Dispersion of the Ingredients

Optical and electron microscopy were performed on selected compositions to assess the type of dispersion in these compositions. Also, 10 grams of compositions I and comparative compositions A, B and C were placed in a glass jar filled with toluene and allowed to roll overnight on the roller bank. The resulting mixture was filtered through a 100 mesh screen and the amount of undissolved residue measured after one night drying in a vacuum oven. The obtained residues were then compression molded into films and analysed through FTIR (the results have been listed in Tables 1, 3, and 4).

Determination of Mechanical Properties

Dumbbells were cut from injection molded slabs. The results have been listed in Tables 1, 3, and 4 as the average value of samples cut parallel and perpendicular to the mold direction tensile properties were measured according to ASTM D 412. Angle tear properties were measured according to ISO 34-79. Shore A hardness was measured after 15 minutes according to ISO 868-1985. Sample plates were further aged at 95° C. for one week and visually checked.

Adhesion Performance Evaluation

The adhesion of the compounds onto different substrates (PP, PA6, PA66, PET and VANDAR) as listed in Table 1 was checked by hand on the insert-molded plates by trying to pull the soft overmolded layer away from the rigid substrate. The adhesion was rated on a scale from 0 to 10. Adhesion 0 means that the two layers could be peeled off without significant effort. Adhesion 1 to 2, characterizes two layers displaying some adhesion without any melt fusion. Adhesion 5 and higher indicates increasingly good adhesion with possible melt-fusion of the two layers.

Physical Properties Evaluation

The physical properties of compositions I, A, and B are typically low hardness, low set material (good elastic recovery). Furthermore, the levels of tensile strength and elongation at break are quite high.

After one week aging at 95° C. in a ventilated air oven, injection molded plates of Composition A did not display any stress cracking nor dimensional changes. Those of Composition I did not display stress cracking but displayed some dimensional changes (from a square sample to a distorted shape).

Adhesion Performance Evaluation

All results are gathered in Tables 3 and 4.

Four materials were used as inserts:

PA6, which was already used as compounding ingredient in Compositions A and I

PA66

VANDAR

Polypropylene (XM 6170K).

Three different injection temperatures were used, 210° C., 230° C., and 260° C., the last two being above the melt temperature of PA6, as well as some different mold temperatures, 60° C. and 120° C.

The evaluation was carried out according to ASTM D903 using a sample having a width of 20 mm and thickness of 2 mm (on a base plate of the same thickness) and using a test speed of 300 mm/min.

Adhesion of Polyamide Modified Compounds on Polyamide (see Table 1)

Adhesion of each compound onto PA6 or PA66 was very similar. The results are reported as adhesion onto PA substrate.

Comparative Compositions A and B did not display satisfactory adhesion onto polyamide substrates at any given temperature.

Composition I displayed very satisfactory adhesion when injected at 210° C. and excellent adhesion when injected at 230° C. and above.

Mold temperature did not have an influence on adhesion behaviour.

From these results, it can be concluded that adhesion onto PA is not a simple function of the ingredients but can be related to the microstructure of the different compounds in the soft composition. PA dispersion in comparative composition A and use of KRATON® FG-1901X without PA in comparative composition B did not give rise to any adhesion onto pure PA substrate. On the contrary, composition I with its very small PA6 particle size, obtained through the use of KRATON® FG-1901X, gave excellent adhesion to the PA substrates.

Most probably, the maleic anhydride groups present in FG-1901 X react with the end-groups of the, e.g., Nylon, PA6, or PET to create chemical bonds. This drives such polyamide or polyester into the KRATON® G matrix and changes the whole nature of the compound which in turn creates the good adhesion onto the PA or PET substrate.

The results of insert molding trials of various KRATON® G compounds modified with PA or PET onto PET or PA substrates are listed in Tables 3 and 4 while the typical overmolding conditions have been listed in Table 5.

The PET used in these Tables 3 and 4 were manufactured by SHELL companies:

SR-35 has a typical intrinsic viscosity of 0.82 dl/g;

SR-47 has a typical intrinsic viscosity of 0.60 dl/g.

The compounding conditions for PET modified KRATON® G block copolymer compounds in Table 4 on Werner and Pfleiderer twin screw co-rotating extruder were:

Temperature settings: 180° C. to 280° C. to 175° C.

Screw speed: 250 rpm

Feed rate: 5 to 10 kg/hr.

TABLE 1

Compositions, typical physical properties and adhesion behaviour of PA modified compound

| Composition reference | I | | Comparative A | | Comparative B | | Comparative C | |
|---|---|---|---|---|---|---|---|---|
| Formulation; (in pbw)* | | | | | | | | |
| KRATON ® G-1650 | 68 | | 100 | | 68 | | 68 | |
| KRATON ® FG-1901X | 32 | | — | | 32 | | 32 | |
| PA6, (Orgamide RMN) | 16 | | 16 | | — | | | |
| VANDAR 9116 | | | | | | | 16 | |
| Oil, (Primol 352) | 43 | | 43 | | 43 | | 43 | |
| Irganox 1010 | 0.3 | | 0.3 | | 0.3 | | 0.3 | |
| Tinuvin 327 | 0.3 | | 0.3 | | 0.3 | | 0.3 | |
| Physical properties: | | | | | | | | |
| Shore A hardness, 15" | 57 | | 65 | | — | | | |
| Modulus 100% MPa | 1.8 | | 2.8 | | 1.7 | | | |
| Modulus 300%, MPa | 3.3 | | 4.4 | | 2.5 | | | |
| Tensile strength, MPa | 7.0 | | 6.5 | | 8.8 | | | |
| Elongation at break, % | 600 | | 570 | | 690 | | | |
| Tear strength, kN/m | 30.0 | | 40.0 | | 34.0 | | | |
| Set at break, % | 14 | | 16 | | — | | | |
| % solid after toluene extraction | 2.5 | | 8.0 | | 0 | | | |
| Main FTIR absorbtion band on solid residue | PA + KG | | PA only | | — | | | |
| Adhesion data; substrate used: | PA | VANDAR | PA | VANDAR | PA | VANDAR | PA | VANDAR |
| Inj. temp.   mold temp. | | | | | | | | |
| 210° C.   60° C. | 6 | 6 | 0 | 0 | 0 | 0 | 6 | 0 |
| 230° C.   60° C. | 8 | 8 | 0 | 0 | 0 | 0 | 8 | 0 |
| 260° C.   60° C. | 8 | 8 | 0 | 0 | 0 | 0 | 8 | 0 |
| 260° C.   120° C. | 8 | 8 | 0 | 0 | 0 | 0 | 8 | 0 |

*pbw - parts by weight per 100 parts of polymer.
(Adhesion rating on scale from 0 (none) to 0 (excellent)).

TABLE 2

Processing Conditions

Compounding conditions on Werner and Pfleiderer twin-screw co-rotating extruder

| | |
|---|---|
| Temperature settings: | 180° C. to 240° C. to 180° C. |
| Actual melt Temperature: | 240° C. |
| Screw speed: | 150 rpm to 250 rpm |
| Torque: | 35% |
| Feed rate: | 5 kg/h |

Demag injection molding conditions for samples I and A–C (210) conditions used for both 2 × 150 × 150 mm plates and 2 mm thick overmoldings: (230) and (260), conditions only used for 2 mm thick overmoldings.

TABLE 2-continued

Processing Conditions

Compounding conditions on Werner and Pfleiderer twin-screw co-rotating extruder

Equipment: Demag D150 injection molder
Temperature, pressure, and time settings
(150 tons clamping force)

| Temperatures | °C. | (210) | (230) | (260) |
|---|---|---|---|---|
| Intake zone | | 35 | 35 | 35 |
| Cylinder heating zone 1 | | 100 | 200 | 230 |
| Cylinder heating zone 2 | | 195 | 210 | 245 |
| Cylinder heating zone 3 | | 205 | 220 | 255 |
| Nozzle heating | | 210 | 230 | 260 |
| Melt | | 210 | 230 | 260 |
| Mold | | 60 | 60 | 60/120 |
| Injection time | s | 1.03 | 0.87 | 0.75 |
| Injection Pressure | bar | 150 | 150 | 150 |
| Holding pressure time | s | 4.0 | 4.0 | 4.0 |
| Holding pressure | bar | 65 | 65 | 65 |
| Back pressure | bar | 20 | 20 | 20 |
| Injection speed | % | 95 | 95 | 95 |

TABLE 3

PA modified KRATON ® G compounds for overmolding trials

| Formulation | | II | III | Comp. D | I | IV |
|---|---|---|---|---|---|---|
| KRATON ® G-1650 | | — | — | — | 68 | 60 |
| KRATON ® FG-1901X | | 100 | 100 | 100 | 32 | 40 |
| Primol 352 | | — | 68 | 134 | 43 | 43 |
| PA6 (Orgamide RMN) | | 50 | 50 | 50 | 16 | 40 |
| Tensile modulus 100% | MPa | 11.0 | 1.5 | | 1.7 | 1.9 |
| | | (0.5) | (—) | | (—) | (—) |
| Tensile strength | MPa | 19.0 | 3.6 | | 7.0 | 5.7 |
| | | (0.6) | (0.2) | | (0.2) | (0.2) |
| Elongation break | % | 400 | 310 | | 600 | 480 |
| | | (25) | (25) | | (10) | (15) |
| Tear strength | N/mm | 80 | 12 | | 30 | 26.5 |
| | | (3.0) | (0.3) | | (1.0) | (0.4) |
| Set at break | | 70 | — | | 14 | 9 |
| Hardness Shore D 15" | | 45 | | | | |
| Hardness Shore A 15" | | 91 | 55 | | 57 | 63 |
| Peel adhesion, on PA6, unaged | N/20 mm | very high | 70 (8) | 10 (1) | 52 (6) | 38 (5) |
| on PA6, after 48 h/ 100° C. | | >100 | 52 (3) | | 23 (3) | 18 (4) |

(—) Standard deviation of measurement

TABLE 4

PET modified KRATON ® G compounds for overmolding trials

| Formulation | | Comp. E | V | VI | VII | VIII |
|---|---|---|---|---|---|---|
| KRATON ® G-1650 | | 100 | 68 | 68 | 84 | 60 |
| KRATON ® FG-1901X | | — | 32 | 32 | 16 | 40 |
| Primol 352 | | 43 | 43 | 43 | 43 | 43 |
| PET SR35 | | 16 | 16 | — | 16 | 40 |
| PET SR47 | | — | — | 16 | — | — |
| Tensile modulus 100% | MPa | 2.3 | 2.0 | 2.0 | 2.0 | 1.5 |
| | | (0.3) | (0.1) | (0.1) | (0.1) | (0.1) |
| Tensile strength | MPa | 6.9 | 4.8 | 5.0 | 5.3 | 4.6 |
| | | (0.4) | (0.2) | (0.2) | (—) | (0.1) |
| Elongation break | % | 650 | 600 | 600 | 600 | 550 |
| | | (30) | (10) | (15) | (15) | (30) |
| Tear strength | N/mm | 35 | 25 | 25 | 27 | 22 |
| | | (1.8) | (1.0) | (1.1) | (1.3) | (0.3) |
| Set at break | | 16 | 13 | 13 | 13 | 10 |
| Hardness Shore D 15" | | 56 | 55 | 54 | 54 | 54 |
| Peel adhesion, on PA6, unaged | N/20 mm | <5 | 46 (9) | 50 (4) | 35 (2) | 65 (7) |
| on PA6, after 48 h/ 100° C. | | | 35 | | | 37 (4) |
| on PET, unaged | | <5 | 28 (3) | 29 (5) | 23 (3) | 31 (4) |
| on PET, after 48 h/ 100° | | | | | | 36 (3) |

(—) Standard deviation of measurement

TABLE 5

Demag typical overmolding conditions relating to samples D–E (Comparatives) and I–VIII
Equipment: Demag D150 injection molder Temperature, pressure and time settings (150 tons clamping force)

| Temperatures | °C. | |
|---|---|---|
| Intake zone | | 35 |
| Cylinder heating zone 1 | | 250 |
| Cylinder heating zone 2 | | 270 |
| Cylinder heating zone 3 | | 280 |
| Nozzle heating | | 290 |
| Melt | | 290 |
| Mold | | 60 |
| Injection time | s | 0.75 |
| Injection Pressure | bar | 150 |
| Holding pressure time | s | 4.0 |
| Holding pressure | bar | 65 |
| Back pressure | bar | 20 |
| Injection Speed | % | 95 |

We claim:

1. A multilayer polymer composition comprising at least one relatively soft touch layer comprising at least one block copolymer derived from a monovinyl aromatic and a conjugated diene, and at least one layer of relatively hard, rigid thermoplastic, which layers have intimate contact with each other, comprising:

(a) at least one relatively soft touch layer comprising
 (i) a polar engineering thermoplast in an amount of from 5 to 50 wt %,
 (ii) from 10 to 70 wt % of a selectively hydrogenated block copolymer, having at least two poly(monovinyl aromatic) blocks and at least one poly(conjugated diene) block, wherein the residual ethylenic unsaturation after hydrogenation is at most 5%,
 (iii) from 5 to 85 wt % of a selectively hydrogenated block copolymer, having at least two poly(monovinyl aromatic) blocks and at least one poly(conjugated diene) block wherein the residual ethylenic unsaturation after hydrogenation is at most 5%, said block copolymer having been functionalized by means of introduced polar groups,
 (iv) a plasticizer in an amount of from 0 to 40 wt %, and wherein all ingredients amounts relative to the weight of the total soft touch layer composition and the sum of the respective amounts of the ingredients (i) to (iv) is 100 wt %, and (b) at least one relatively hard, rigid layer comprising at least a polar engineering thermoplast.

2. The multilayer composition according to claim 1, characterized in that the soft touch layer is characterized in that the polar engineering thermoplasts to be used as components (i) are selected from the group consisting of polyesters derived from an aromatic acid and polyamides.

3. The multilayer composition according to claim 2, characterized in that the polar engineering thermoplasts to be used as component (b) are selected from the group consisting of polyesters derived from an aromatic acid and polyamides.

4. The multilayer polymer composition according to claim 1, characterized in that the polar engineering thermoplasts are selected from the group consisting of NYLON 6,6, NYLON 6, polyethyleneglycol terephthalate (PET), and polybutyleneglycol terephthalate (PBT).

5. The multilayer polymer composition according to claim 4, characterized in that PET or PBT are used.

6. A shaped article derived from the multilayer polymer composition according to claim 1.

* * * * *